US010373412B2

(12) United States Patent
Trani

(10) Patent No.: US 10,373,412 B2
(45) Date of Patent: Aug. 6, 2019

(54) SYSTEM AND METHOD FOR CONTROLLING ACCESS TO AN ACCESS POINT

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 255 days.

(21) Appl. No.: 15/014,457

(22) Filed: Feb. 3, 2016

(65) Prior Publication Data

US 2017/0221289 A1 Aug. 3, 2017

(51) Int. Cl.

| | |
|---|---|
| ***G07C 9/00*** | (2006.01) |
| ***H04N 7/18*** | (2006.01) |
| ***H04W 4/04*** | (2009.01) |

(52) U.S. Cl.

CPC ...... *G07C 9/00158* (2013.01); *G07C 9/00111* (2013.01); *H04N 7/183* (2013.01); *H04W 4/043* (2013.01); *G07C 9/00* (2013.01); *G07C 9/00087* (2013.01); *G07C 9/00103* (2013.01)

(58) Field of Classification Search

None

See application file for complete search history.

(56) References Cited

U.S. PATENT DOCUMENTS

| | | | | |
|---|---|---|---|---|
| 2004/0017929 A1* | 1/2004 | Bramblet | G07C 9/00 | 382/103 |
| 2004/0153671 A1 | 8/2004 | Schuyler et al. | | |
| 2006/0169876 A1* | 8/2006 | Zambon | G01S 7/481 | 250/221 |
| 2009/0115570 A1* | 5/2009 | Cusack, Jr. | G07C 9/00103 | 340/5.2 |
| 2011/0292213 A1* | 12/2011 | Lacey | H04N 7/181 | 348/153 |

(Continued)

FOREIGN PATENT DOCUMENTS

| | | |
|---|---|---|
| DE | 10 2004 042 999 A1 | 3/2006 |
| DE | 10 2009 000 006 A1 | 7/2010 |
| WO | 03/088157 A1 | 10/2003 |

OTHER PUBLICATIONS

International Search Report and Written Opinion of the International Searching Authority, dated Apr. 21, 2017, from International Application No. PCT/US2017/014336, filed on Jan. 20, 2017. Thirteen pages.

(Continued)

*Primary Examiner* — Kate H Luo

(74) *Attorney, Agent, or Firm* — HoustonHogle LLP

(57) ABSTRACT

A security system comprises a positioning unit that determines locations of user devices relative to a threshold of the access point, a surveillance camera that monitors the threshold, and an access control system that controls the access point based on the locations of the user devices and orientations of individuals carrying the user devices relative to the access point. The surveillance camera is used to prevent tailgating. The cameras image data is also analyzed to determine the orientation of the individuals relative to the access point, such as a door. If the individuals are oriented such that they may be merely walking past the door, then access is not granted.

19 Claims, 7 Drawing Sheets

(56) References Cited

U.S. PATENT DOCUMENTS

| | | | | |
|---|---|---|---|---|
| 2012/0283997 | A1* | 11/2012 | Flous | G08B 31/00 703/1 |
| 2012/0307051 | A1* | 12/2012 | Welter | G08B 13/248 348/143 |
| 2013/0050483 | A1* | 2/2013 | Itoh | G06K 9/00221 348/143 |
| 2013/0214898 | A1* | 8/2013 | Pineau | G06F 21/32 340/5.6 |
| 2014/0160293 | A1* | 6/2014 | Ristivojevic | H04N 7/18 348/150 |
| 2015/0259966 | A1* | 9/2015 | Sakai | E05F 15/73 49/31 |

OTHER PUBLICATIONS

International Preliminary Report on Patentability, dated Aug. 16, 2018, from International Application No. PCT/US2017/014336, filed on Jan. 20, 2017. Nine pages.

* cited by examiner

SYSTEM AND METHOD FOR CONTROLLING ACCESS TO AN ACCESS POINT

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control systems, surveillance cameras, image analytics systems, and/or network video recorders (NVRs), to list a few examples.

Access control systems in buildings, for example, are principally concerned with physical security and the selective access to, restriction of, and/or notification of access to a place or other resource. Historically, the main components of the access control systems were access control readers and possibly door controllers. The access control readers were often installed to enable presentation of credentials to obtain access to restricted areas, such as buildings or areas of the buildings. The readers were installed near access points, such as doors or hallways or elevators. Typically, individuals would interact with the access control readers by swiping keycards or bringing contactless smart cards within range (approximately 2-3 inches or 5 centimeters) of the reader. The access control readers would read the credential information of the keycards and validate the information possibly by reference to a verification system that confirmed the credentials and determined if the individuals were authorized to access the restricted areas. If the individuals were authorized, then the access control readers might signal door controller to unlock doors or not generate alarms, for example.

More recently, frictionless access control systems are being proposed and designed. These systems typically rely on individuals carrying beacon devices that can broadcast credentials, such as dedicated fob devices or personal mobile computing devices such as tablet or smart phone computing devices. The access control systems will then monitor and track the individuals as they move through the buildings and automatically open access points such as doors when approached, assuming that the individuals are authorized to pass through those access points.

SUMMARY OF THE INVENTION

When security systems implement more "frictionless" the operation, the intention of the individuals to access a restricted area, for example, is inferred to some or even a large extent. Because the systems are frictionless, the individual may not have made any overt gesture indicating a desire to access the restricted area, e.g., the individuals did not swipe a keycard. Therefore, the security systems should be intelligent to assess whether there is an intention to enter the restricted area.

At the same time, the systems need to be more intelligent to handle more complex situations. For example, the access control systems need to determine whether to unlock a door, for example, when some individuals near the door are authorized and some are not and also deal with the situations where the identity of some of the individuals cannot be determined.

In general, according to one aspect, the invention features a security system. The system comprises a positioning unit that determines locations of user devices relative to a threshold of the access point, a surveillance camera that monitors the threshold, and an access control system that controls the access point based on the locations of the user devices and orientations of individuals carrying the user devices relative to the access point.

In embodiments, an analytics system is further provided that receives image data from the surveillance camera, determines the orientations of the individuals relative to the access point by analyzing the image data, and provides the orientations of the individuals to the access control system. The analytics system can analyze the image data to determine positions and/or orientations of the individuals relative the plane of the access point.

The access control system can infer that the individuals are carrying the user devices by reference to image data from the surveillance camera. The access control system can then further control the access point in response to determining that the user devices have entered the threshold and determining that the individuals are not passing by the threshold area. It is inferred that the individuals are not passing by the access point when it is determined that an upper body of the individuals is facing the access point. In contrast, individuals are inferred to be merely passing by the access point when it is determined that an upper body of the individuals is not facing the access point.

Tailgating is also addressed in some configurations. The system infers that the individuals are tailgating in response to determining a greater number of individuals detected in the threshold than the user devices determined to be located relative to the threshold area and/or a greater number of individuals detected in the threshold than a number of the valid credentials from the user devices.

A directional antenna is preferably used for determining whether the user devices are in the threshold of the access point.

In general, according to another aspect, the invention features a method for controlling an access point. The method comprises determining locations of user devices relative to a threshold of the access point, capturing image data from the threshold, and controlling the access point based on the locations of the user devices and orientations of individuals carrying the user devices relative to the access point.

In general, according to another aspect, the invention features a security system, which comprises a positioning unit including at least one antenna that determines whether user devices are in a threshold of an access point, a surveillance camera that generates image data of the threshold, a video analytics system that analyzes the image data to determine locations of the individuals in the threshold, and an access control system that controls the access point based on the locations of the individuals and information from the positioning unit concerning the user devices in the threshold area.

A security system workstation can be provided that includes a drawing tool for defining a projected aperture of the at least one antenna within the image data, wherein the projected aperture is drawn by an operator over the image data, in one example. An image analytics system can be used to determine the locations of the individuals in the threshold area by comparing the individuals in the image data relative to a projected aperture of the at least one antenna.

In general, according to still another aspect, the invention features a method, which comprises determining whether user devices are in a threshold of an access point, generating image data of the threshold, analyzing the image data to determine locations of the individuals in the threshold, and controlling the access point based on the locations of the individuals and information from the positioning unit concerning the user devices in the threshold area.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
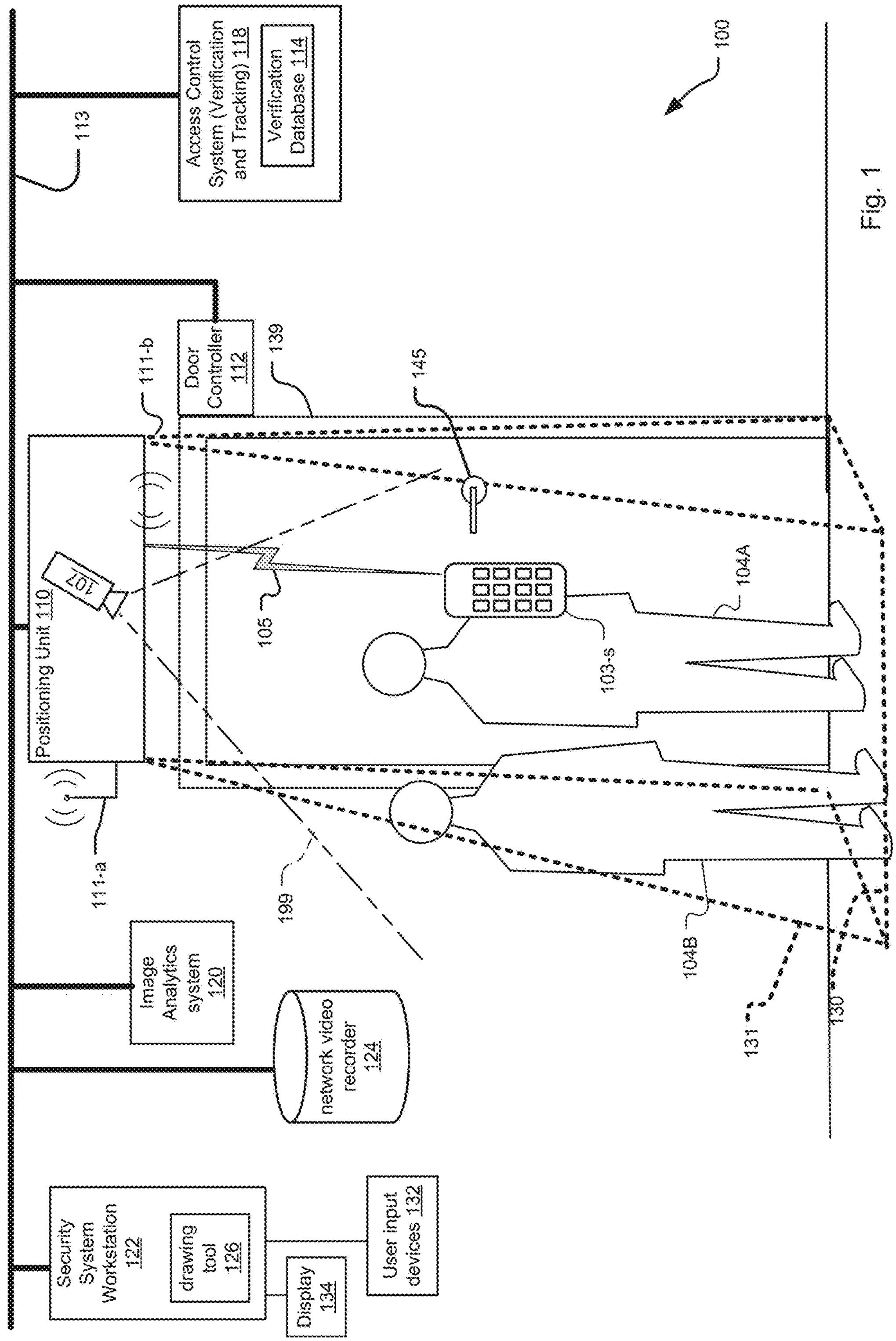
FIG. 1 is a schematic diagram showing a security system with an access control system, using a positioning unit at an access point.

FIG. 1 is a block diagram of an exemplary security system 100 and particularly an access control system that identifies individuals/users 104, tracks locations of beacon user devices 103 such as fobs, smart phones or other mobile computing devices, and monitors access to restricted or different areas of a building, for example, through access points such as doors 139.

The access control system includes a positioning unit 110 that is typically installed in room or other locations in the buildings. In the illustrated example, it is installed in connection with the door access point 139. The positioning unit 110, in one implementation, comprises an antenna system 111-*a*, 111-*b* that enables the positioning unit to 110 determine locations of the user devices relative to the access point 139.

Different technologies could be used to locate the user devices relative to the access point 139. For example, indoor GPS systems that rely on multiple antennas and triangulation are one example.

The positioning unit 110 in the illustrated example uses a combination of antennas and specifically a directional antenna 111-*b* that has a projected beam aperture 131 that enables it to preferentially detect emissions from user devices 103 that are located at a threshold 130 of the access point 139. In the illustrated example, an omnidirectional antenna 111-*a* is also provided that enables the positioning unit 110 to detect the emissions from user devices beyond just the threshold to the access point 139 and in the room, for example, or in the whole building.

In the illustrated embodiment, the omnidirectional antenna system 111-*a* and directional antenna system 111-*b* are installed in a ceiling above the access point 139. In another example, the directional antenna system 111-*b* could be installed in the floor with its aperture directed toward the ceiling. Still other examples, the aperture 131 could be directed from the ceiling or floor at an oblique or slant angle but directed at the threshold.

In particular, the directional antenna system 111-*b* detects emissions from beacon devices such as mobile computing devices 103-1, 103-2 carried by individuals 104-1, 104-2 typically standing at the threshold 130 of the access point.

The directional antenna 111-*b* receives greater power in the direction of its projected aperture 131 allowing it to detect when beacon devices 103 enter the volumetric region above the threshold 130. Different types of directional antennas could be used here such as parabolic antennas, helical antennas, yagi antennas, and phased arrays of smaller antennas of any kind. Horn antennas can also be used. A better option in some cases would be a patch or microstrip array antenna. These antennas would comprise flat metal or conductive strips mounted above a ground plane.

The radiofrequency beacon emissions detected by the directional antenna 111-*b* are processed by the positioning unit 110. In one embodiment, the user devices 103 broadcast using BLE (Bluetooth low energy) technology. Bluetooth is a wireless technology that operates in a 2.4 GHz (gigahertz) short-range radio frequency band. A lower power version of standard Bluetooth called Bluetooth Low Energy (BLE), in contrast, consumes between ½ and 1/100 the power of classic Bluetooth. BLE is optimized for devices requiring maximum battery life instead of higher data transfer rates associated with classic Bluetooth. BLE has a typical broadcast range of about 100-150 feet (approximately 35-46 meters). In other examples, however, the directional antenna 111-*b* detects other radiofrequency or optical emissions. Alternative implementations include other wireless technologies such as Wi-Fi (IEEE 802.11), active RFD (radio frequency identification), or ZigBee, to list a few examples.

In general, an access controller 118 uses the information from positioning unit 110 to determine whether individuals are at the threshold to the access point 139, which event may give rise to the generation of a security event based on any policies or business rules.

In the illustrated example, the access controller 118 also functions to verify credentials broadcast by the beacon devices 103 and specifically verify that the individuals to which those beacon devices are assigned are authorized to enter or transit the access point 139.

In one example, the access controller 118 identifies the beacon devices 103 based on their emissions and then the individuals 104 to which those beacon devices 103 are assigned. This information would possibly be stored in a verification database 114.

Based on the security credentials of the associated individuals 104, it is determined whether those individuals are authorized to transit the access point 139. In one specific example, the access control system 118, after validating the credentials of the individuals 104, signals the door controller 112 to unlock the door 139 to thereby grant access through the access point to the individuals 104.

In one example, to validate the users 103, the access controller 116 compares hashes, generated from security credentials, or security tokens assigned to the individuals, and broadcast from the beacon devices 104. These hashes or tokens are compared to a list of hashes or tokens of authorized individuals. The list of hashes or tokens of authorized users is maintained in the verification database 114. Often, both the hashes or tokens sent by the beacon devices 103 and the hashes or tokens included in the verification database 114 are time sensitive and will expire unless renewed.

A surveillance camera 107 is also provided. The surveillance camera is oriented such that its field-of-view or at least part of its field-of-view includes the threshold 130 to the access point 139. Further, in one embodiment, the surveillance camera 107 is generally oriented above the access point 139 such that it looks down at the threshold area and the individuals 104 that are located or standing in the threshold area 130.

Also provided is an image analytics system 120. This receives the image data from the surveillance camera 107 and performs image analytics operations. Specifically, in one example, it tracks individuals within the camera's field-of-view and determines whether or not any individuals are entering or leaving the threshold area 130. It may further be used to perform facial recognition or other biometric analysis, for example, on the individuals 104.

In examples, the image analytics system 120 could be a separate system or implemented within the surveillance camera 107, or even implemented as part of the positioning unit 110 or the access control system 118.

In general, the surveillance camera 107 sends captured image data to the network video recorder 124, which store the image data and possibly any associated metadata. Typically, time and date information are added to image data to enable the data to be indexed and reviewed at a later date. The image analytics system 120 will typically analyze the image data and associate metadata to moving objects (e.g., people), identify numbers of moving objects, and identify specific users, to list a few examples.

The image analytics system 120 will typically further implement tripwire processing. This enables the analytics system to determine when individuals cross tripwires and to generate metadata concerning the crossing. This image analysis tripwire is preferably coextensive with the threshold 130 to the access point in addition to other tripwires associated with individuals nearing the access point threshold.

In one example, facial recognition information determined from the image data is used to confirm that the individuals 104 possessing the user devices 103 are the proper users. In other examples, the tracking information is combined with the video data to determine which persons in a scene are users (holding users devices) and which are non-users.

Also included in one example is a security system workstation 122. This may include a display 134 along with user input devices 132. A drawing tool application program 126 executing on the security system workstation 122 enables operators and/or installers to configure the image analytics system 120 and specifically inform the image analytics system as to the relationship between the field-of-view of the surveillance camera 107 and the area of the access point threshold 130 and also the projected aperture 131 of the directional antenna 111-*b* of the positioning unit 110. Configuring the image analytics system 120 with this information enables the analytics system to determine when individuals are at the threshold and further the relationship between any emissions detected by the positioning unit 110 from the threshold of the access point and thus the relationship to the individuals 104 detected within the image data from the surveillance camera 107.

Also shown in this figure is one situation where two individuals 104A, 104B are both in the threshold area to the doorway 139. Only one of those individuals, however, is carrying a beacon device 103-S and thus is presenting security credentials for validation. The other individual 104B is also in the threshold area giving rise to a potential tailgating situation.

Figure 2:
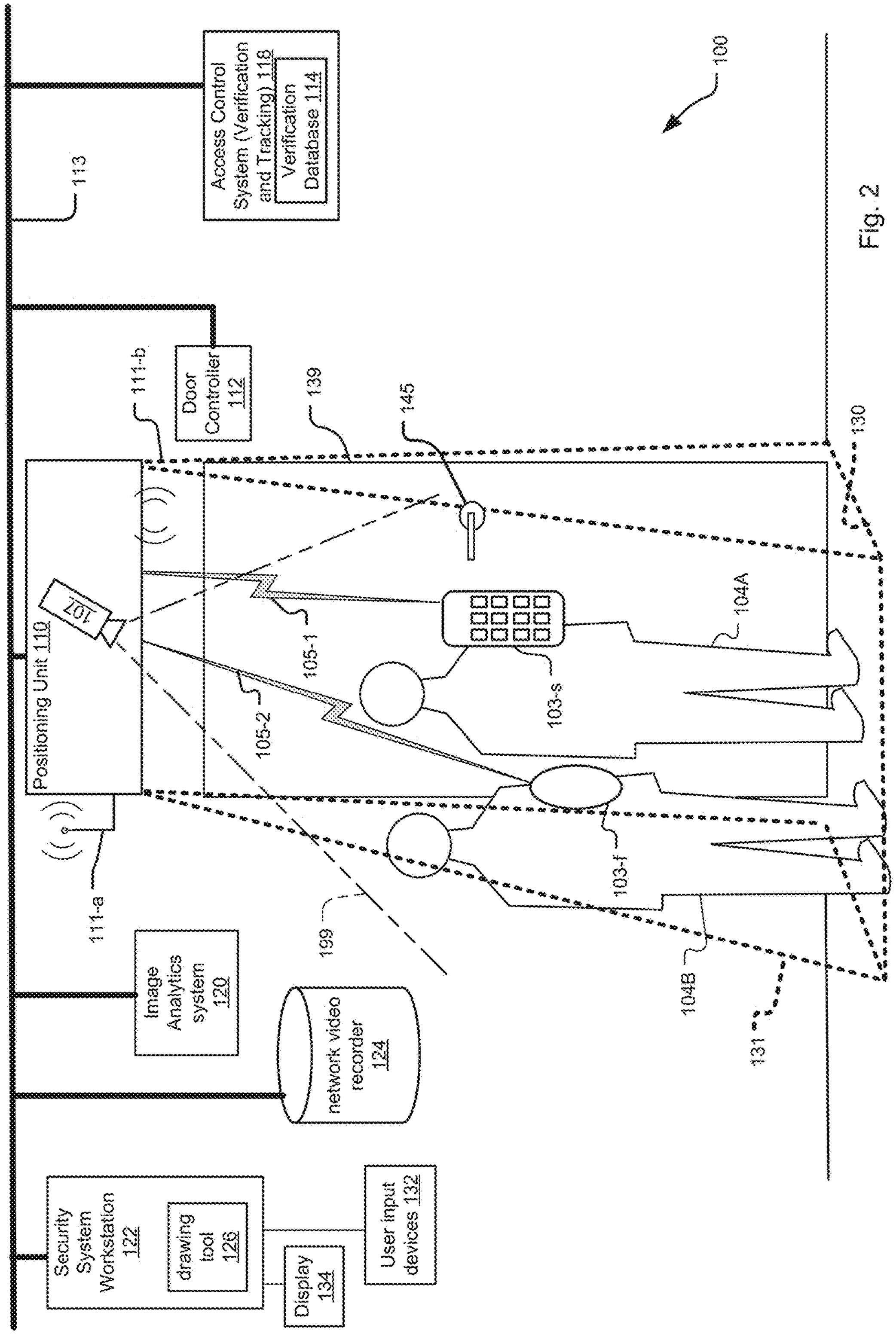
FIG. 2 is a schematic diagram showing the security system with the access control system when two individuals are located at the threshold of the access point.

FIG. 2 illustrates a situation where two individuals 104A, 104B are both in the threshold area to the doorway 139. Here, they both have beacon devices 103-*s*, 103-*f*. Thus the credentials of both of the individuals may be validated or not.

Figure 3:
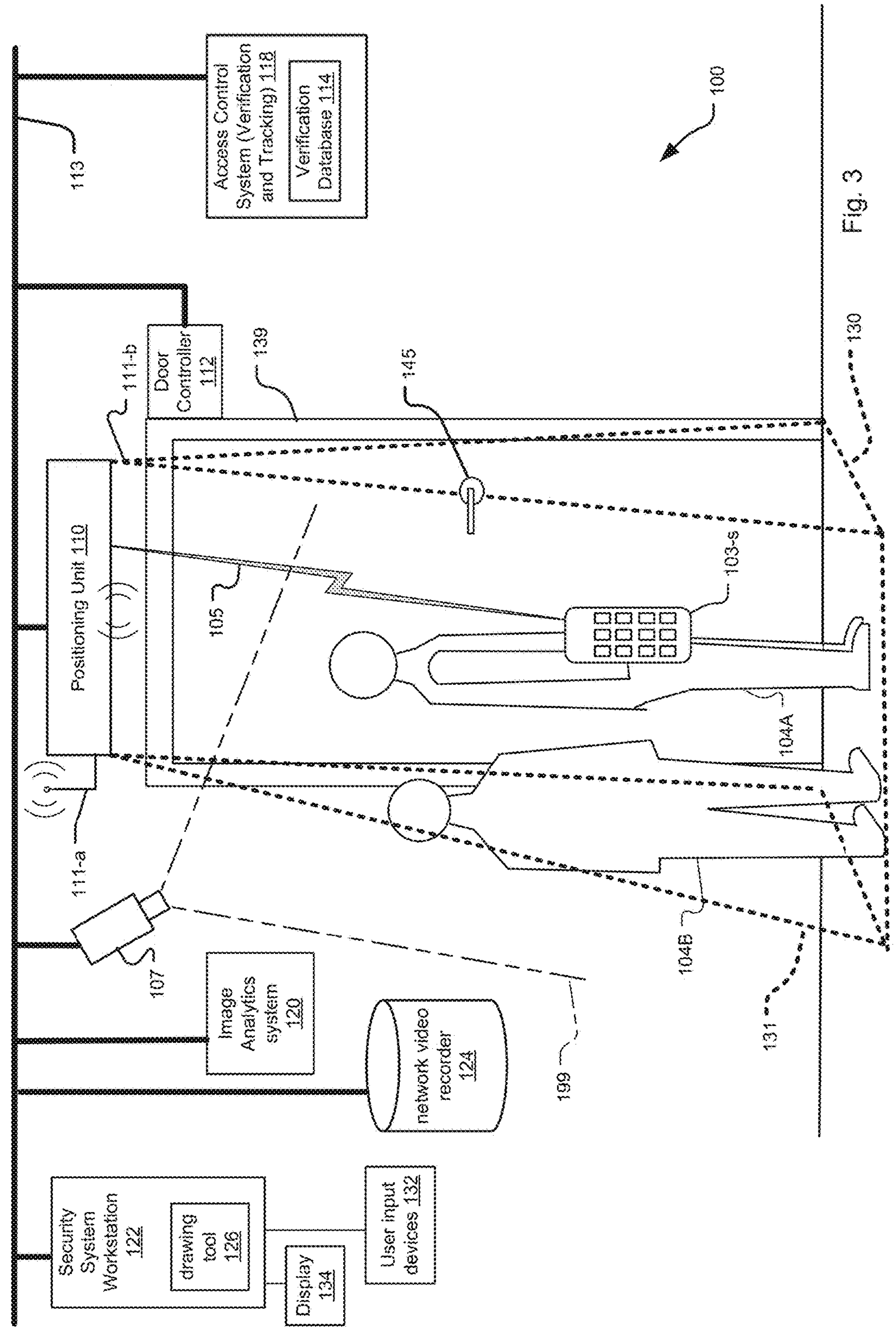
FIG. 3 is a schematic diagram showing a security system with an access control system when two individuals are located at the threshold of the access point and one of the individual may be merely passing the access point.

FIG. 3 illustrates a situation where two individuals 104A, 104B are both in the threshold area to the doorway 139. Here, only individual 104A is carrying beacon device 103-*s* and can thus have their credentials validated. This individual 104A, however, is oriented such that they may be merely walking past the doorway 139. On the other hand individual 104B is oriented such that they appear to want to transit the access point yet they have no beacon device. Thus, generally the access control system 118 would not unlock the door 139. This would avoid the situation of granting access through the access point merely because someone with valid credentials was passing through the threshold area 130 at the time when another individual was seeking to improperly transit the access point.

Figure 4:
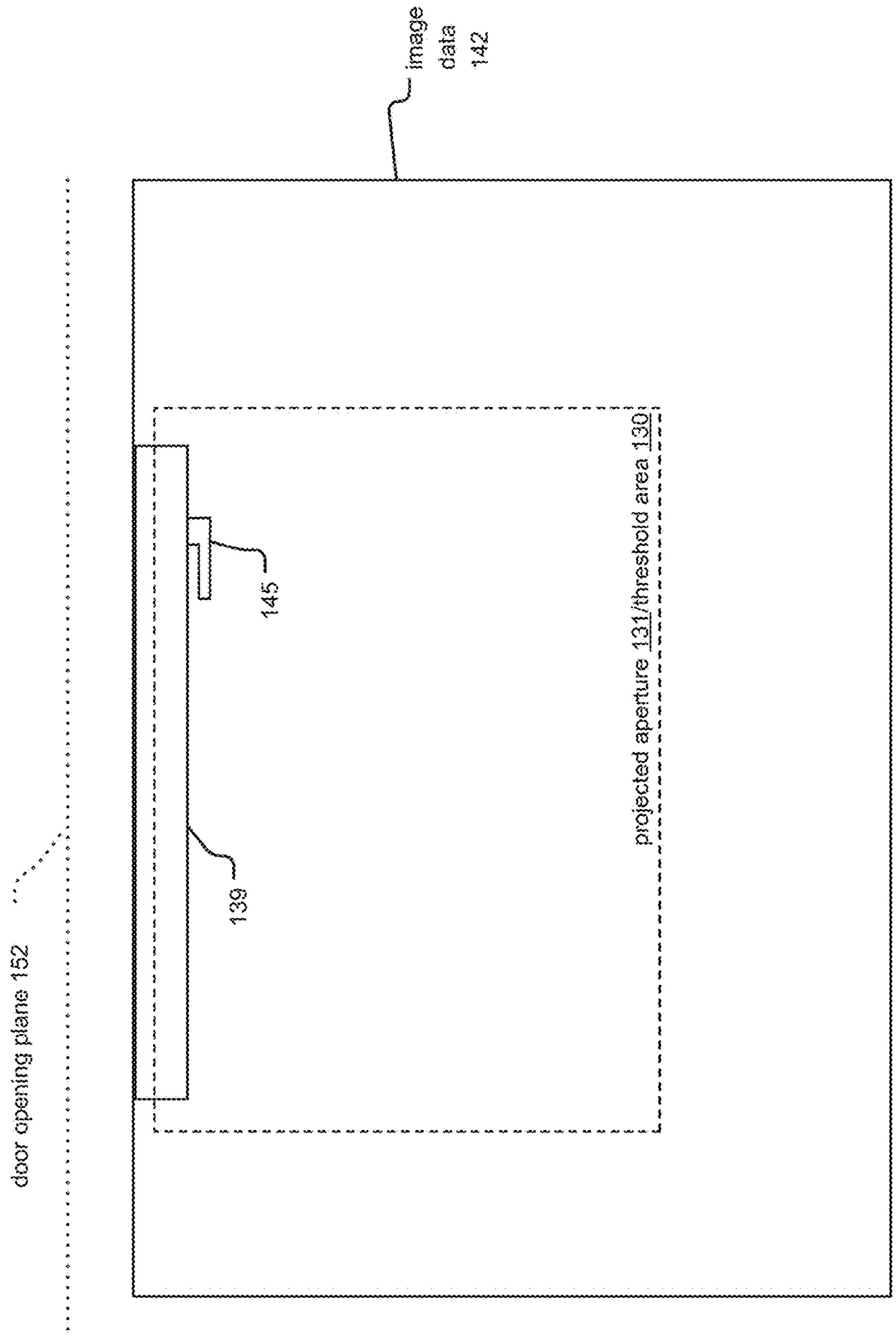
FIG. 4 is a schematic diagram showing the relationship between a door access point, the antenna aperture of the positioning unit and the field of view of the surveillance camera.

FIG. 4 illustrates the relationship between the projected aperture 131, the threshold area 130 of the access point (which is shown to be co-extensive with the volumetric region of the projected aperture 131 at the level of the floor), and the image data 142 collected by the surveillance camera 107. As shown, in a typical example, the projected aperture 131 is a portion of the field-of-view 142 of the surveillance camera 107. As a result, the surveillance camera 107 can determine when individuals are located within the threshold area 131 and also possibly determine and track individuals as they approach or walk away from that threshold area.

In one embodiment, the drawing tool 126 is used to specify the extent of the projected aperture/threshold area 131 within the field of the image data 142. Typically, this is performed by an operator or installer as part of a setup procedure.

Figure 5:
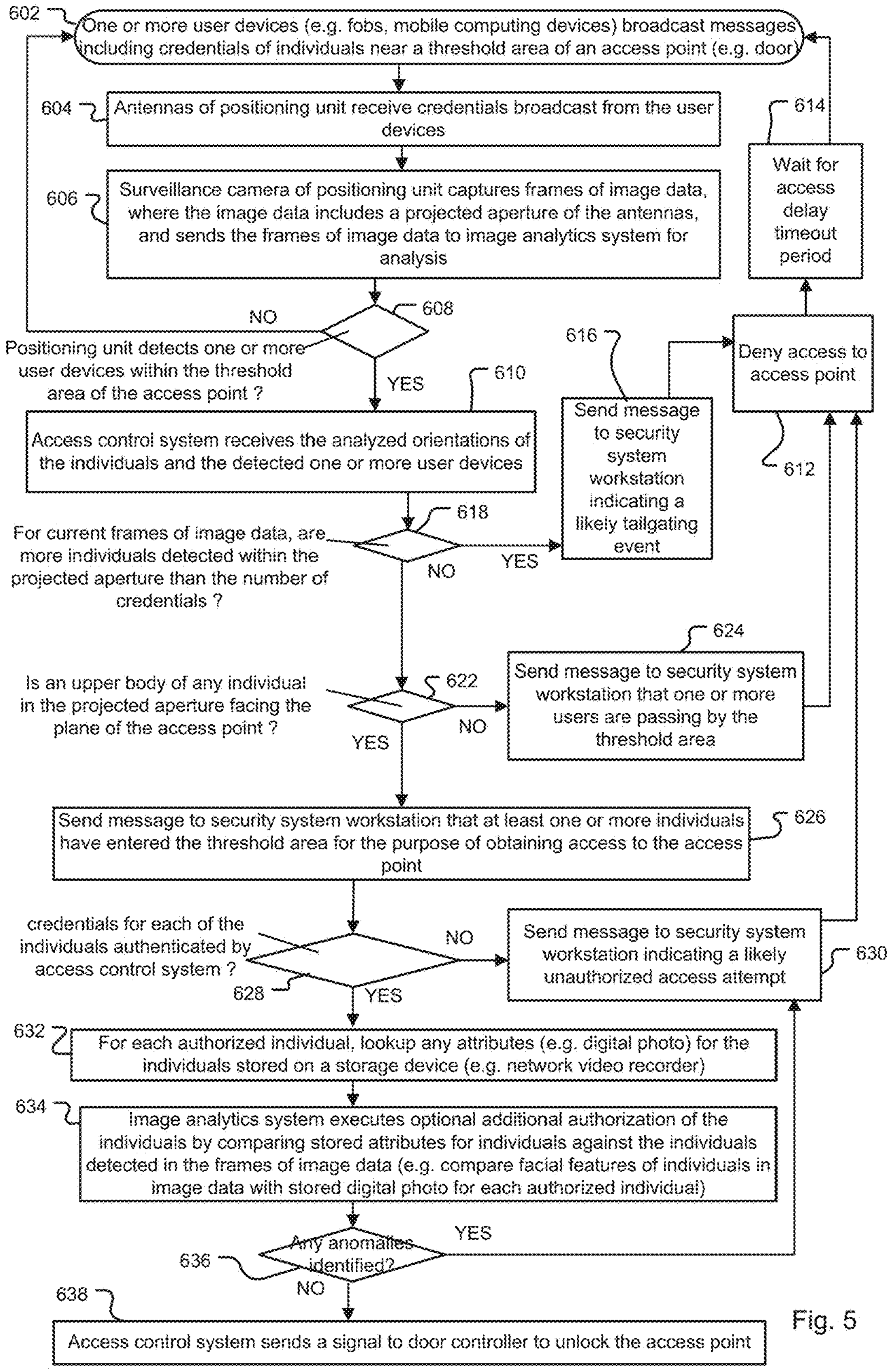
FIG. 5 is a flow diagram showing the operation of the access control system based on information from the positioning unit and the surveillance camera.

FIG. 5 is a flow diagram illustrating the operation of the access control system 118 based on the information received from the surveillance camera 107, the positioning unit 110, and the image analytics system 120.

In more detail, one or more user devices such as fobs or mobile computing devices broadcast messages or other types of beacons. These broadcasts may take place near or in the threshold area 130/directional antenna coverage volume 131 of the access point 139.

In step 604, the antennas 111-*a*, 111-*b* of the positioning unit 110 receive the beacons and/or credentials broadcast from the user devices 103. At the same time, in step 606, the surveillance camera 107 of the positioning unit 110 captures frames of image data. This image data includes the threshold area 130 and the volumetric region of the projected aperture 131 of the directional antenna 131 of the positioning unit 110. In addition, the frames also include the area around the threshold area 130, in one embodiment. These frames of image data are sent to the analytic system 120 for analysis.

In step 608, the positioning unit 110 detects the existence of one or more user devices 103 in the threshold area 130 of the access point 139 if such devices are detected, then the access control system 118 begins the process of confirming whether or not the access point, such as the door, should be unlocked to allow those individuals to pass. Otherwise, processing returns back to step 602 to continue to track the user devices.

Upon detection of the user devices in the threshold area 130, the access control system 118 receives image information and/or video primitives from the image analytics system in step 610. The video primitive sent to the access control system include one or more of the following: 1) the number and location of individuals in the threshold area, 2) the number and location of individuals near the threshold area, 3) the identity of those individuals based on facial recognition, for example, and/or 4) the orientation of each of the individuals relative to the plane 152 of the access point 139, for example.

In some examples, the access control system 110 may try to determine which of the individuals 104 at the threshold area 131 are in possession of which of the detected user devices 103. This may be accomplished through the use of additional directional antennas that can identify specific locations for the user devices 103 within the threshold area. Steerable antennas such as phased array antennas are used in some cases to scan individuals for possession of beacon devices and then attribute specific beacon devices to specific individuals identified in the image data from the surveillance camera 107.

In any event, in step 618 the access control system 118 determines whether or not there are more individuals detected within the area of the projected aperture than the number of beacon devices 131.

If it is determined that more individuals are detected by the image analytics system 120 than beacon devices 103, the access control system 110 concludes that a possible tailgating event is taking place. In one example, a message is sent to the security system workstation 122 indicating this security event. Further, in one embodiment, access to the access point is denied in step 612.

In other examples, depending on the business rules and security policies, an alarm may be generated instead of blocking transit through the access point. In still other examples, metadata is added to the image data stored in the network video recorder. In still other examples, a welcome message could be displayed to the unknown individual.

In any event, in the illustrated example, a timeout is implemented in step 614 in which no access is granted through the access point to thereby block the improper tailgating, according to one possibly policy.

Figure 6:
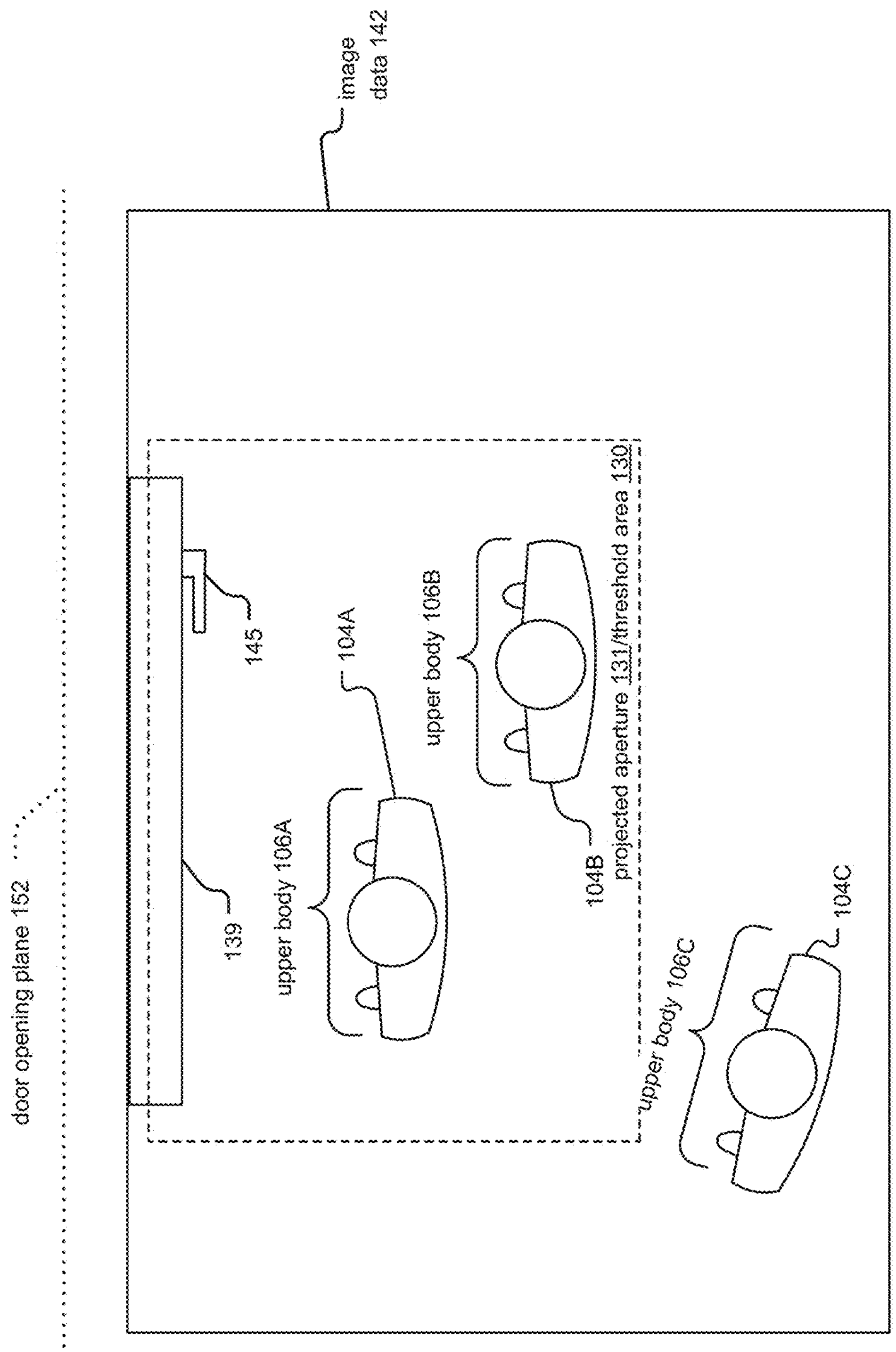
FIG. 6 is a schematic diagram showing the situation where two individuals would be inferred as trying to transit the access point.

On the other hand, with respect to step 618, if the number of individuals detected within the threshold area is a same as number of beacon devices detected in that area, then in step 622, the orientation of any individuals within the threshold area 131 is determined. Specifically, if the individuals are determined to be facing the door, i.e, their shoulders are parallel to the plane 152 of the access point 139 based on the analytics system's analysis of the image data, then access control system 110 infers that they desire access through the access point. An example of this scenario is illustrated in FIG. 6.

Figure 7:
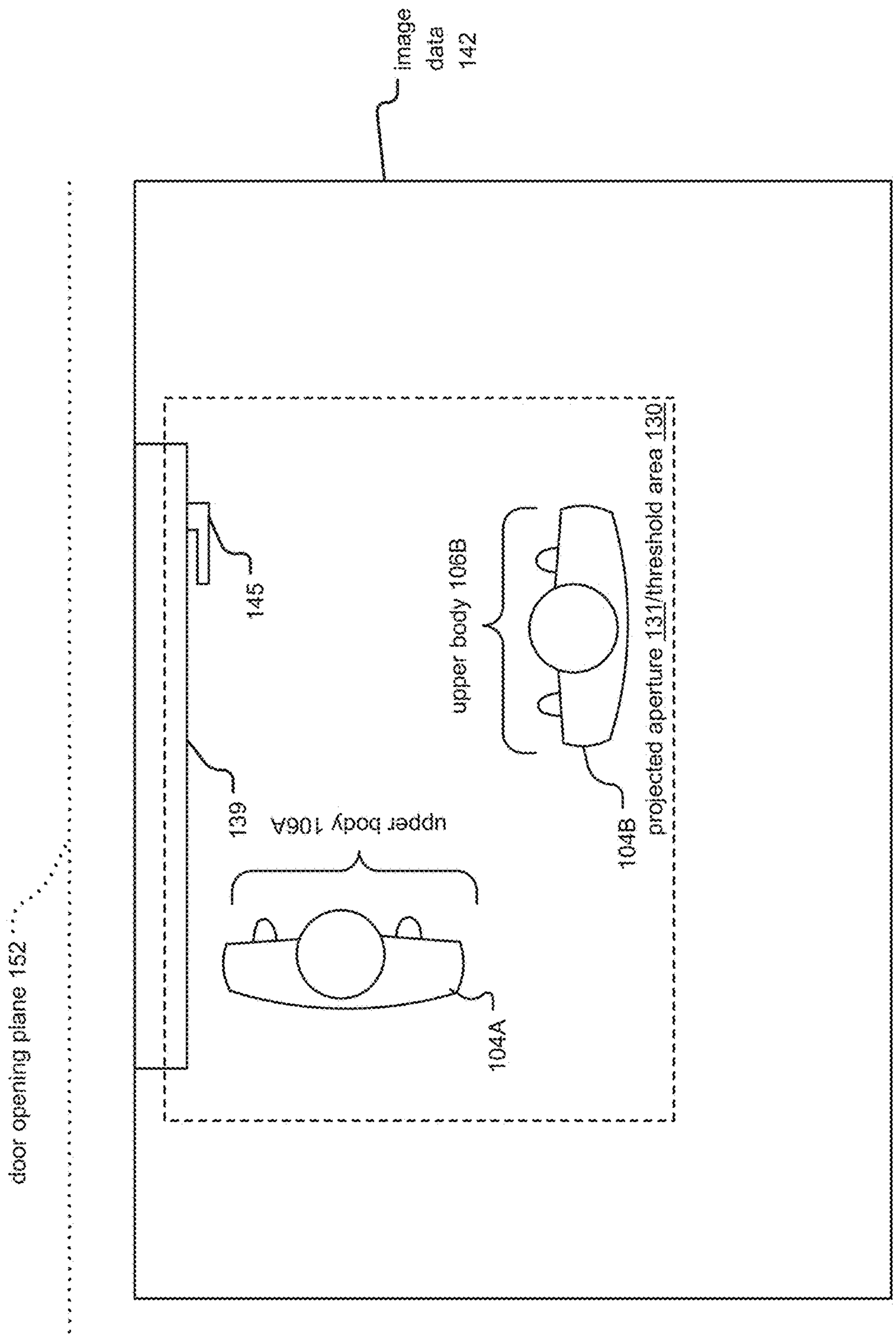
FIG. 7 is a schematic diagram showing the situation where one individual may be merely passing by the access point.

On the other hand, if the body orientations are determined to be such that some of the individuals are not seeking access, such as merely walking in front of the access point, in step 622, then a message can be sent to the security workstation 122. This scenario is shown in FIG. 7. Metadata indicating a "passing event" can also be added to the image data in step 624. Further, access is denied in step 612 according to one exemplary policy.

In the illustrated example, in step 626, message is sent, for example, to the security system workstation 122 that one or more individuals have entered the threshold area for the purpose of the obtaining access through the access point 139. Surveillance images from the camera 107 are further sent to the workstation in some cases.

If it is determined that the individual are oriented such that they are seeking access, it is determined whether of the individuals are authenticated by the access control system. That is, if the credentials are not authenticated in step 628, then in step 630 messages sent to the security workstation 122 indicating a likely unauthorized attempt to access the access point. Further, metadata can be added to the image data stored in the network video recorder 124 in connection with this event and the image data from surveillance camera 107.

On the other hand, if the credentials are authenticated in step 628, an additional facial recognition step can be performed in some cases. Specifically, in steps 632 and 634 the facial or other characteristics are retrieved from the verification database 114, for example, and compared to those of the individuals 104 possessing the authorized devices 103 that have been detected in the threshold area 130. This ensures correspondence between the individuals carrying the user devices and the true owners of those user devices.

If no anomalies are detected in step 636, then the access control system 118 provides access through the access point 139. In one example, the door controller 112 is signaled to unlock the door, for example.

On the other hand, if anomalies are determined to exist in step 636 then a security event is again instantiated, for example, in step 638. Messages are sent to the security workstation 122 indicating the possibility of an authorized attempt to access the access point and a stolen user device.

FIG. 6 illustrates situation where two individuals 104A, 104B are oriented to such that the access control system 118 would infer that they are attempting to obtain access through the door 139. Specifically, their shoulders 106A, 106B extend in a direction that is parallel to the plane 152 of the door 139. On the other hand, the orientation of a third individual 104C is somewhat ambiguous having shoulders 106C angled in an oblique direction relative to the plane 152 of the door 139.

FIG. 7 illustrates an example where one of the individuals 104A may be merely passing in front of the door 139. Another individual 104B may be trying to gain access through the door 139. In this example, the access control system 118 would not unlock the door 139 based on the credentials of user 104A, since it appears that this user may be simply walking past the door.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system, comprising:

a positioning unit that determines locations of user devices relative to a threshold of an access point;

a surveillance camera that generates image data of the threshold determining orientations of the individuals; and an access control system that controls the access point based on the locations of the user devices from the positioning unit and the orientations of individuals carrying the user devices relative to the access point;

an analytics system that receives the image data from the surveillance camera, determines the orientations of the individuals relative to the access point by analyzing the image data to determine whether the shoulders of the individuals are parallel to a plane of the access point, and provides the orientations of the individuals to the access control system.

2. The system of claim 1, wherein the access control system infers that the individuals are carrying the user devices by reference to image data from the surveillance camera.

3. The system of claim 1, wherein the access control system controls the access point in response to determining that the user devices have entered the threshold and determining that the individuals are not passing by the threshold.

4. The system of claim 3, wherein the access control system determines that the individuals are not passing by the access point by determining that an upper body of the individuals is facing the access point.

5. The system of claim 3, wherein the access control system determines that the individuals are passing by the access point by determining that an upper body of the individuals is not facing the access point.

6. The system of claim 1, wherein the access control system infers that the individuals are tailgating in response to determining a greater number of individuals detected in the threshold than the user devices determined to be located relative to the threshold.

7. The system of claim 1, wherein the positioning unit receives credentials from the user devices, and wherein the access control system infers that the individuals are tailgating in response to determining a greater number of individuals detected in the threshold than a number of the valid credentials from the user devices.

8. The system of claim 1, wherein the positioning unit includes at least one directional antenna for determining whether the user devices are in the threshold of the access point.

9. The system of claim 1, further comprising a positioning unit that detects a number of the user devices within the threshold area; and wherein the analytics system detects a number of individuals at the access point and the access control system determines whether a possible tailgating event is taking place based on the number of user devices determined by the positioning unit and the number of individuals from the analytics system.

10. The system of claim 1, wherein the surveillance camera is oriented above the access point such that it looks down at the threshold area and on tops of heads of the individuals that are located or standing in the threshold area.

11. A method for controlling an access point, comprising:

determining locations of user devices relative to a threshold of the access point;

capturing image data from the threshold with a surveillance camera;

an analytics system receiving the image data from the surveillance camera and determining the orientations of the individuals relative to the access point by analyzing the image data to determine whether the shoulders of the individuals are parallel to a plane of the access point; and controlling the access point based on the locations of the user devices and orientations of the shoulders of the individuals carrying the user devices relative to the access point.

12. The method of claim 11, further comprising determining positions of the individuals relative the plane of the access point.

13. The method of claim 11, further comprising inferring that the individuals are carrying the user devices by reference to the image data.

14. The method of claim 11, further comprising controlling the access point in response to determining that the user devices have entered the threshold and determining that the individuals are not passing by the threshold area.

15. The method of claim 14, further comprising determining that the individuals are not passing by the access point by determining that an upper body, of the individuals is facing the access point.

16. The method of claim 14, further comprising determining that the individuals are passing by the access point by determining that an upper body of the individuals is not facing the access point.

17. The method of claim 11, further comprising inferring that the individuals are tailgating in response to determining a greater number of individuals detected in the threshold than the user devices determined to be located relative to the threshold.

18. The method of claim 11, further comprising inferring that the individuals are tailgating in response to determining a greater number of individuals detected in the threshold than a number of valid credentials from the user devices.

19. The method of claim 11, using at least one directional antenna to determine whether the user devices are in the threshold of the access point.

* * * * *